Patented Feb. 2, 1937

2,069,726

UNITED STATES PATENT OFFICE 2,069,726

LACQUER

Jacob M. Schantz, Wilmington, Del., assignor to Hercules Powder Company, Wilmington, Del., a corporation of Delaware No Drawing. Application July 10, 1935, Serial No. 30,638

7 Claims. (Cl. 134—79)

This invention relates to an improved lacquer and more particularly to a lacquer comprising a cellulose derivative, as, for example, nitrocellulose, cellulose acetate, cellulose acetobutyrate, ethyl cellulose, benzyl cellulose, etc. and extracted pine wood pitch.

Extracted pine wood pitch, which is a complex resinous material whose exact composition is unknown, comprises the residue left after the separation of rosin, turpentine and other more valuable constituents of pine wood. The pine wood pitch will comprise a residue low in abietic acid remaining after the separation of refined rosin high in abietic acid from the resinous material obtained by extraction of pine wood with a solvent. It is characterized by substantial insolubility in cold petroleum hydrocarbons, but will differ somewhat in its specific characteristics, such as acid number, melting point, exact petroleum ether solubility, and content of naphtha and toluol soluble matter, depending upon the method for the recovery of rosin from pine wood used in its production.

As is well known, rosin is extracted from pine wood by the use of a suitable solvent, such as hot gasoline, or benzol after steaming of the wood with live steam to remove volatile oils, such as turpentine and pine oil. Again, volatile oils, as turpentine, and pine oil, are extracted with the rosin without first steaming for their removal.

Following extraction the extract is distilled for the removal of solvent where the wood was subjected to steaming before extraction and for the removal of solvent and volatile oils, as turpentine and pine oil, where the wood was extracted directly without steaming. As the result of distillation a resinous material containing abietic acid and admixed impurities is obtained. This resinous material may be treated in any one of a number of ways, all known to the art, for the removal of refined rosin high in abietic acid. The residue remaining after the removal of refined rosin and comprising a dark colored, hard, resinous mass low in abietic acid constitutes the pine wood pitch.

The exact properties of the pine wood pitch obtained as indicated above will depend upon the method used for original extraction from the wood. When the wood is steamed before solvent extraction, a pine wood pitch is obtained having somewhat different properties from that obtained when the wood is extracted without steaming. Likewise the properties of pin wood pitch are somewhat different when obtained by different methods of purification of rosin. A comparison of the properties of three pine wood pitches is given in the following table, in which pitch A is that obtained by extraction of wood with hot petroleum solvents subsequent to the removal of the volatile oils by steam distillation, refining with furfural, evaporation of the furfural and a final extraction of the residue with petroleum solvent to remove petroleum soluble matter. Pitch B is that obtained by a benzol extraction of unsteamed wood, evaporation of the benzol solution of the residue in hot low boiling petroleum solvent, precipitation of the pitch B by washing with cold water, and then removal of this precipitate by filtration. Pitch C is obtained by the evaporation of the furfural layer, after refining of the gasoline solution of the crude resin obtained by the benzol extraction of pine wood:

|  | Pitch A | Pitch B | Pitch C |
|---|---|---|---|
| Melting point (Hercules drop method) | 91° C. | 115° C. | 102° C. |
| Acid number | 100 | 105 | 116 |
| Unsaponifiable matter |  | 5% | 8% |
| V. M. & P. naphtha insoluble | 89.5% | 96% | 83% |
| Toluol soluble |  | 40% | 98% |
| Petroleum ether insoluble | 92.0% | 99% | 95% |
| Saponification number |  | 169 | 140 |
| Ash |  | .036% | .022% |

It is often desirable to subject the extracted pine wood pitch to a heat treatment at about 200°–250° C. to reduce a certain tendency to foam possessed by the untreated pitch. Such heat treatment will change the physical properties of the pine wood pitch to some extent. Thus, pitch B when heat treated has the following characteristics:

|  | Heat treated pitch B |
|---|---|
| Melting point (drop method) | 120° C. |
| Acid number | 83 |
| Unsaponifiable matter | 10% |
| V. M. & P. naphtha insoluble | 97% |
| Toluol soluble | 80% |
| Petroleum ether insoluble | 99% |
| Saponification number |  |
| Ash | .040% |

Now in accordance with this invention it has been found that extracted pine wood pitch may be used advantageously in the formulation of cellulose derivative lacquers in place of other resins or resinous materials heretofore used, as, for example, ester gum, dammar, copal, etc. The lacquers so produced are superior to similar lacquers made with, for example, ester gum, both in hardness and durability, and are characterized by high resistance to gasoline and petroleum oils.

Lacquers in accordance with this invention will be found to be of great value for use as protective coatings, due to their excellent resistance to weathering. They will also be found to be of great value where high resistance to mineral oils, such as lubricating oils, gasoline and vegetable oils is desired, and well suited for coating, for example, the interior of paper containers for lubricating oils.

The lacquers in accordance with this invention will comprise essentially a cellulose derivative, as, for example, nitrocellulose, cellulose acetate, cellulose acetobutyrate, ethyl cellulose, benzyl cellulose, etc., extracted pine wood pitch and a solvent. Preferably a plasticizer, as, for example, castor oil, dibutyl phthalate, tricresyl phosphate, etc. will be included. Other resins and various pigments, dyes, etc. may likewise be included if desired.

In the usual type of cellulose ester lacquer in which the cellulose ester is the principal film-forming ingredient, the extracted pine wood pitch will preferably be present in from about 10% to about 90% of the cellulose derivative, altho the exact ratio will vary widely with the particular cellulose derivative employed and the particular use for which the lacquer is intended. The plasticizer, if one be used, may also be present in widely varying amounts, but a range of from about 30% to about 60% of the cellulose ester will be ordinarily employed. Other resins and pigments, dyes, etc., may be added in desired or usual quantities to suit the requirements of the particular lacquer being formulated.

The non-volatile ingredients will be dissolved in a solvent or solvent mixture in any desired ratio to furnish the finished lacquer. A ratio of from 3 to 5 parts total solvent per part of total non-volatiles represents usual formulation, but may be varied to adapt the lacquer for particular conditions of use. Any solvent or solvent mixture which is capable of dissolving both the cellulose derivative and the extracted pine wood pitch may be used, but ordinarily a mixture of solvents, as, for example, butyl alcohol, butyl acetate, ethyl acetate, etc. and non-solvents or diluents, as, for example, toluol, xylol, etc., will be employed. Because of the marked insolubility of extracted pine wood pitch in petroleum hydrocarbons, these materials can be used only to a very limited extent in solvent mixtures for producing the lacquers in accordance with this invention. Even aromatic hydrocarbons, as toluol, etc., must be used with care in such solvent mixtures and the ratio of toluol to the actual solvents present in the mixture cannot exceed certain values, which, however, vary with the nature of the solvents.

The following table shows typical formulae for lacquers in accordance with this invention, and also shows results of tests for hardness and durability in comparison with similarly formulated prior art lacquers using ester gum as a resin:

Table I

|  | Old art | | Present invention | | | | | |
| --- | --- | --- | --- | --- | --- | --- | --- | --- |
| Formula No. | 1 | 2 | 3 | 4 | 5 | 6 | 7 | 8 |
| Nitrocellulose | 8 | 8 | 8 | 8 | 10 | 10 | 10 | 10 |
| Extracted pine wood pitch B | | | 6.4 | 6.4 | 3 | 3 | 3 | 3 |
| Ester gum | 6.4 | 6.4 | | | | | | |
| Dibutyl phthalate | 3.2 | | 3.2 | | 6 | 4 | | |
| Castor oil | | 3.2 | | 3.2 | | | 6 | 4 |
| Solvent mixture | 82.4 | 82.4 | 82.4 | 82.4 | 81 | 83 | 81 | 83 |
| Fence durability (days) | 10 | 10 | 63 | 72 | 63 | 56 | 28 | 25 |
| Hardness (Pfund) | 165 | 200 | 210 | 200 | 150 | 300 | 175 | 400 |

It will be noted that the lacquers containing extracted pine wood pitch are much more durable than corresponding ester gum lacquers, and that lacquer films of great hardness can be produced which are nevertheless more durable than much softer ester gum lacquer films.

The solvent mixture used in the above formulae was composed of:

| | Parts by weight |
| --- | --- |
| Ethyl alcohol SD#1 | 7 |
| Butanol | 3 |
| Butyl acetate | 15 |
| Toluol | 50 |

The cellulose ester used in the formulations given above was nitrocellulose of the so-called ester soluble type. Other types of nitrocellulose and other cellulose esters, as, for example, cellulose acetate, cellulose acetobutyrate, etc., and cellulose ethers, as, for example, ethyl cellulose, may be used in similar formulations in the production of lacquers in accordance with this invention. The following table shows typical formulae for lacquers containing cellulose acetobutyrate, ethyl cellulose and benzyl cellulose.

Table II

| Formula No. | 9 | 10 | 11 | 12 | 13 |
| --- | --- | --- | --- | --- | --- |
| Cellulose acetobutyrate | 12 | 12 | 12 | | |
| Benzyl cellulose | | | | 7.5 | |
| Ethyl cellulose | | | | | 7.5 |
| Extracted pine wood pitch B | 2 | 5.3 | 12 | 0.8 | 1.5 |
| Dibutyl phthalate | 2 | 2.7 | 3 | | |
| Ethylene dichloride | 104 | 100 | 93 | | |
| Butanol | 5 | 5 | 5 | 8.5 | 8 |
| Ethyl lactate | 15 | 15 | 15 | | |
| Diacetone alcohol | 10 | 10 | 10 | | |
| Toluol | 40 | 40 | 40 | | |
| Acetone | 10 | 10 | 10 | | |
| Xylol | | | | 33 | 33 |

In particular, nitrocellulose of the alcohol soluble type may be used with extracted pine wood pitch to produce valuable lacquers. The solvent mixture used will, of course, be formulated to take care of the different solubility characteristics of the nitrocellulose. A satisfactory solvent mixture for use with this type of nitrocellulose consists of 70 parts alcohol and 30 parts toluol. The alcohol soluble nitrocellulose and the extracted pine wood pitch may be formulated into lacquers in quantities similar to those given in Table I above, or, advantageously, the quantity of nitrocellulose used may be materially reduced with reference to the amount of pine wood pitch present, for example, to from about 10% to about 50% of the pine wood pitch, to produce lacquers somewhat resembling shellac in their properties.

The following table shows typical ratios of non-volatile ingredients for the production of such shellac-like lacquers, and also shows results of comparative tests among such lacquers and with shellac itself:

Table III

| Formula No. | 1 | 2 | 3 | 4 | 5 | 6 | 7 | 8 | 9 | |
| --- | --- | --- | --- | --- | --- | --- | --- | --- | --- | --- |
| | Parts by weight | | | | | | | | | |
| Alcohol soluble nitrocellulose | 1 | 1 | 1 | 2 | 2 | 2 | 3 | 3 | 3 | |
| Extracted pine wood pitch B | 9 | 9 | 9 | 8 | 8 | 8 | 6 | 6 | 6 | |
| Dibutyl phthalate | 1 | 2 | 4 | 1 | 2 | 4 | 1 | 2 | 4 | Shellac |
| Hardness rating | 4 | 5 | 7 | 2 | 4 | 5 | 1 | 2 | 3 | 6 |
| Flexibility on metal | 5 | 4 | 1 | 4 | 2 | 1 | 4 | 3 | 2 | 4 |
| Adhesion on metal | 3 | 3 | 1 | 3 | 2 | 1 | 5 | 4 | 2 | 3 |
| Water resistance | All good except shellac. | | | | | | | | | |

(#1 is highest rating, #2 next, etc.)

It will be noted from the above table that the compositions made from extracted pine wood pitch and alcohol soluble nitrocellulose compare very favorably with shellac. In the first place, they are very substantially better than shellac in their resistance to water. Their adhesion to metal can be made substantially better, about the same, or slightly less, depending on their formulation. This, likewise, applies both to flexibility and hardness.

It will be understood that the details and examples hereinbefore set forth are illustrative only, and that they are in no way in limitation of the invention as herein broadly described and claimed.

What I claim and desire to protect by Letters Patent is:

1. A lacquer comprising a cellulose derivative and a resinous material the components of which are soluble in coal tar hydrocarbons and insoluble in petroleum hydrocarbons.

2. A lacquer comprising a cellulose derivative and a resinous material comprising a residue obtained by the extraction of pine wood with a coal tar hydrocarbon, evaporating the volatile constituents of the extract and separating petroleum soluble components from the non-volatile residue.

3. A lacquer comprising a cellulose derivative, a solvent and a resinous material comprising a residue obtained by the extraction of pine wood with a coal tar hydrocarbon, evaporating the volatile constituents of the extract and separating petroleum soluble components from the non-volatile residue.

4. A lacquer comprising a cellulose derivative, a plasticizer, a solvent and a resinous material comprising a residue obtained by the extraction of pine wood with a coal tar hydrocarbon, evaporating the volatile constituents of the extract and separating petroleum soluble components from the non-volatile residue.

5. A lacquer comprising nitrocellulose, a solvent and a resinous material comprising a residue obtained by the extraction of pine wood with a coal tar hydrocarbon, evaporating the volatile constituents of the extract and separating petroleum soluble components from the non-volatile residue.

6. A lacquer comprising a cellulose derivative, a solvent and a resinous material comprising a residue obtained by the extraction of pine wood with a coal tar hydrocarbon, evaporating the volatile constituents of the extract and separating petroleum soluble components from the non-volatile residue, the resinous material being present in amount from about 50% to about 90% of the cellulose derivative.

7. A lacquer comprising nitrocellulose a solvent and a resinous material comprising a residue obtained by the extraction of pine wood with a coal tar hydrocarbon, evaporating the volatile constituents of the extract and separating petroleum soluble components from the non-volatile residue, the resinous material being present in amount from about 10% to about 50% of the cellulose derivative.

JACOB M. SCHANTZ.